US009153168B2

(12) United States Patent
Osame et al.

(10) Patent No.: US 9,153,168 B2
(45) Date of Patent: Oct. 6, 2015

(54) METHOD FOR DECIDING DUTY FACTOR IN DRIVING LIGHT-EMITTING DEVICE AND DRIVING METHOD USING THE DUTY FACTOR

(75) Inventors: Mitsuaki Osame, Kanagawa (JP); Yu Yamazaki, Tokyo (JP); Tomoyuki Iwabuchi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1051 days.

(21) Appl. No.: 10/610,243

(22) Filed: Jul. 1, 2003

(65) Prior Publication Data

US 2004/0008252 A1 Jan. 15, 2004

(30) Foreign Application Priority Data

Jul. 9, 2002 (JP) ................................ 2002-199778

(51) Int. Cl.

*G06F 3/038* (2013.01)
*G09G 5/00* (2006.01)
*G09G 3/32* (2006.01)
*G09G 3/20* (2006.01)

(52) U.S. Cl.

CPC ............ *G09G 3/3233* (2013.01); *G09G 3/2014* (2013.01); *G09G 3/2025* (2013.01); *G09G 2300/0842* (2013.01); *G09G 2300/0861* (2013.01); *G09G 2310/02* (2013.01); *G09G 2310/0251* (2013.01); *G09G 2310/0256* (2013.01); *G09G 2320/043* (2013.01)

(58) Field of Classification Search

CPC . G09G 3/3233; G09G 3/2025; G09G 3/2014; G09G 2320/043; G09G 2310/0251; G09G 2310/0256; G09G 2310/02; G09G 2300/0861; G09G 2300/0842

USPC ......... 345/55, 76–80, 82, 83, 94–96, 99, 101, 345/204, 214, 208–210, 215, 690–693; 315/169.1, 169.3; 349/72; 250/552, 250/553

See application file for complete search history.

(56) References Cited

U.S. PATENT DOCUMENTS 4,224,616 A * 9/1980 Kamagata et al. .............. 345/35
4,737,782 A * 4/1988 Fukuma et al. ................. 345/51

(Continued)

FOREIGN PATENT DOCUMENTS

EP 1061497 B1 12/2000
EP 1085496 A2 * 3/2001 .............. G09G 3/32

(Continued)

*Primary Examiner* — Jonathan Horner
(74) *Attorney, Agent, or Firm* — Fish & Richardson P.C.

(57) ABSTRACT

There is provided a method for deciding a duty factor in driving a light-emitting device and a driving method using the duty factor that enable restraint of deterioration of light-emitting elements and improvement in reliability. In a method for deciding a duty factor of a light-emitting device that performs display based on an analog video signal, with respect to a characteristic obtained by multiplying the characteristic of luminance after X hours in relation to the current density and the characteristic of luminance after X hours in relation to the duty factor when the total quantity of electricity flowing through light-emitting elements in one frame period is defined at a specific value, a range of duty factor that enables realization of luminance approximately exceeding a value that is 0.8 times a maximum value is regarded as an optimum range of duty factor.

9 Claims, 13 Drawing Sheets

CHANGE IN STANDARDIZED LUMINANCE WITH TIME

(56) References Cited

U.S. PATENT DOCUMENTS

| | | | | | |
|---|---|---|---|---|---|
| 4,805,994 | A | * | 2/1989 | Miyajima | 349/145 |
| 4,859,910 | A | * | 8/1989 | Iwakawa et al. | 315/169.1 |
| 5,231,382 | A | * | 7/1993 | Tanaka | 345/60 |
| 5,387,838 | A | * | 2/1995 | Hirakawa et al. | 313/496 |
| 5,550,066 | A | * | 8/1996 | Tang et al. | 438/29 |
| 5,583,531 | A | * | 12/1996 | Okada et al. | 345/89 |
| 5,621,426 | A | * | 4/1997 | Okada et al. | 345/95 |
| 5,684,365 | A | * | 11/1997 | Tang et al. | 315/169.3 |
| 5,736,881 | A | * | 4/1998 | Ortiz | 327/175 |
| 5,745,087 | A | * | 4/1998 | Tomiyoshi et al. | 345/89 |
| 5,990,629 | A | * | 11/1999 | Yamada et al. | 315/169.3 |
| 5,990,630 | A | * | 11/1999 | Nakamura | 315/169.4 |
| 6,005,646 | A | * | 12/1999 | Nakamura et al. | 349/33 |
| 6,008,588 | A | * | 12/1999 | Fujii | 315/169.3 |
| 6,046,547 | A | * | 4/2000 | Nishio et al. | 315/169.3 |
| 6,087,786 | A | * | 7/2000 | Allen et al. | 315/291 |
| 6,151,006 | A | * | 11/2000 | Yanagi et al. | 345/94 |
| 6,160,594 | A | * | 12/2000 | Hanami et al. | 349/34 |
| 6,239,453 | B1 | * | 5/2001 | Yamada et al. | 257/79 |
| 6,297,813 | B1 | * | 10/2001 | Okada et al. | 345/204 |
| 6,380,689 | B1 | | 4/2002 | Okuda | |
| 6,402,339 | B1 | * | 6/2002 | Mukogawa et al. | 362/184 |
| 6,421,033 | B1 | * | 7/2002 | Williams et al. | 345/55 |
| 6,424,094 | B1 | * | 7/2002 | Feldman | 315/169.3 |
| 6,437,762 | B1 | * | 8/2002 | Birdwell | 345/48 |
| 6,452,341 | B1 | * | 9/2002 | Yamauchi et al. | 315/169.1 |
| 6,466,187 | B1 | * | 10/2002 | Moon | 345/63 |
| 6,509,885 | B1 | * | 1/2003 | Hanaki et al. | 345/76 |
| 6,528,951 | B2 | * | 3/2003 | Yamazaki et al. | 315/169.3 |
| 6,577,072 | B2 | * | 6/2003 | Saito et al. | 315/185 R |
| 6,583,775 | B1 | | 6/2003 | Sekiya et al. | |
| 6,614,083 | B1 | * | 9/2003 | Yamazaki et al. | 257/412 |
| 6,661,428 | B1 | * | 12/2003 | Kim | 345/690 |
| 6,730,934 | B2 | * | 5/2004 | Yamada et al. | 257/79 |
| 6,853,130 | B2 | | 2/2005 | Morii | |
| 6,864,863 | B2 | | 3/2005 | Kasai | |
| 6,950,079 | B2 | * | 9/2005 | Inoue | 345/46 |
| 7,034,339 | B2 | * | 4/2006 | Matsuura et al. | 257/79 |
| 7,061,452 | B2 | * | 6/2006 | Inoue et al. | 345/76 |
| 7,088,334 | B2 | * | 8/2006 | Adachi et al. | 345/102 |
| 7,133,015 | B1 | * | 11/2006 | Yoshida et al. | 345/99 |
| 7,138,762 | B2 | | 11/2006 | Morii | |
| 7,154,454 | B2 | * | 12/2006 | Okabe et al. | 345/76 |
| 7,167,190 | B2 | * | 1/2007 | Ito et al. | 345/690 |
| 2001/0000335 | A1 | * | 4/2001 | Yamada et al. | 438/1 |
| 2001/0022565 | A1 | * | 9/2001 | Kimura | 345/82 |
| 2001/0030511 | A1 | * | 10/2001 | Yamazaki et al. | 315/160 |
| 2001/0035863 | A1 | * | 11/2001 | Kimura | 345/205 |
| 2002/0036610 | A1 | * | 3/2002 | Ito et al. | 345/89 |
| 2002/0041162 | A1 | * | 4/2002 | Tsujioka et al. | 315/169.1 |
| 2002/0047555 | A1 | * | 4/2002 | Inukai | 315/169.3 |
| 2002/0057469 | A1 | * | 5/2002 | Yushiya et al. | 358/509 |
| 2002/0085377 | A1 | * | 7/2002 | Mukogawa et al. | 362/184 |
| 2002/0105487 | A1 | * | 8/2002 | Inoue | 345/82 |
| 2002/0113764 | A1 | * | 8/2002 | Yamada et al. | 345/88 |
| 2002/0158590 | A1 | * | 10/2002 | Saito et al. | 315/291 |
| 2003/0011559 | A1 | * | 1/2003 | Adachi et al. | 345/102 |
| 2003/0071274 | A1 | * | 4/2003 | Ohno et al. | 257/113 |
| 2003/0189677 | A1 | * | 10/2003 | Kawabata et al. | 349/34 |
| 2004/0041751 | A1 | * | 3/2004 | Takahashi | 345/76 |
| 2004/0066363 | A1 | * | 4/2004 | Yamano et al. | 345/98 |
| 2004/0114396 | A1 | * | 6/2004 | Kobayashi et al. | 362/561 |
| 2004/0169622 | A1 | * | 9/2004 | Matsuura et al. | 345/76 |
| 2004/0189548 | A1 | * | 9/2004 | Takeuchi et al. | 345/55 |
| 2005/0104835 | A1 | * | 5/2005 | Misonou et al. | 345/96 |
| 2006/0119279 | A1 | * | 6/2006 | Matsuura et al. | 315/169.3 |

FOREIGN PATENT DOCUMENTS

| | | | | | |
|---|---|---|---|---|---|
| EP | 1 094 436 | A2 | | 4/2001 | |
| EP | 1 197 942 | A2 | | 4/2002 | |
| EP | 1 197 943 | A1 | | 4/2002 | |
| JP | 2000-268957 | A | | 9/2000 | |
| JP | 2001060076 | A | | 3/2001 | |
| JP | 2001-109432 | A | | 4/2001 | |
| JP | 2001338771 | A | | 12/2001 | |
| JP | 2002-100470 | | | 4/2002 | |
| JP | 2002-100471 | | | 4/2002 | |
| JP | 2002-189448 | A | | 7/2002 | |
| WO | WO 03017730 | A1 | * | 2/2003 | H05B 33/08 |

* cited by examiner

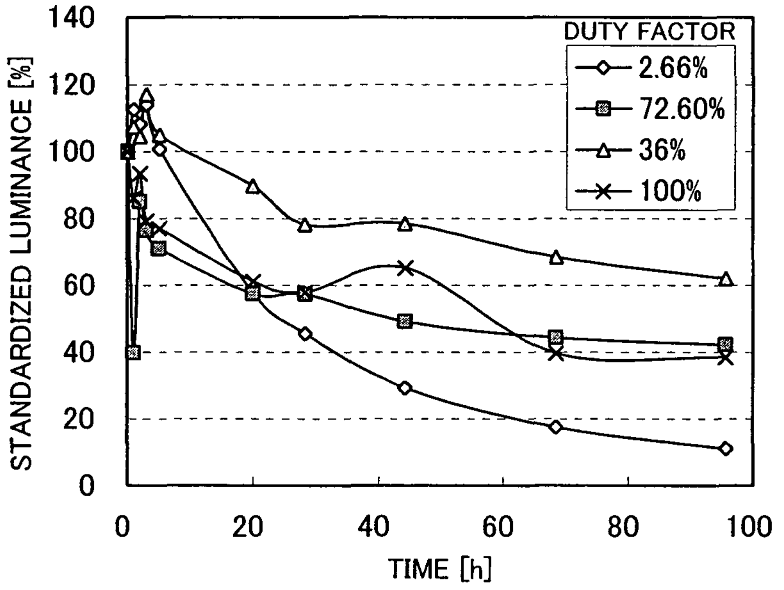
Fig. 1 CHANGE IN STANDARDIZED LUMINANCE WITH TIME

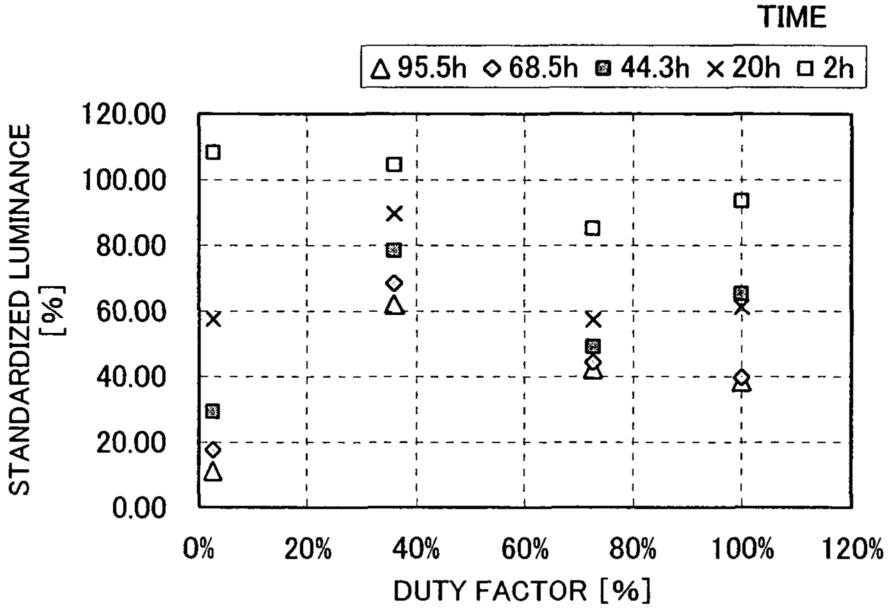
Fig. 2 RERATION OF STANDARDIZED LUMINANCE AND DUTY FACTOR

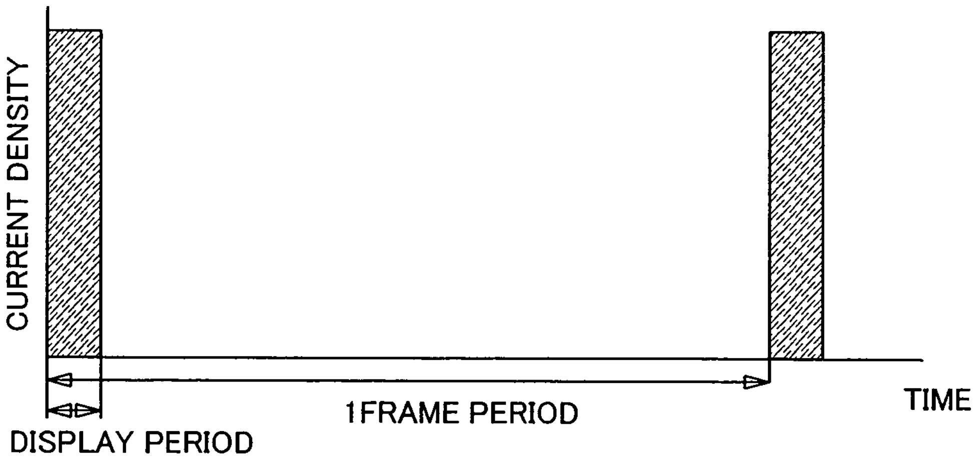
Fig. 3A SMALL DUTY FACTOR
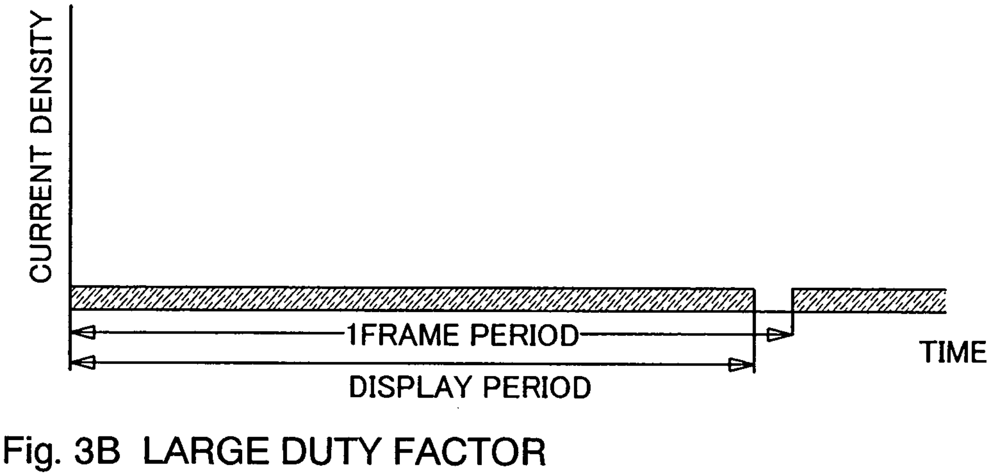
Fig. 3B LARGE DUTY FACTOR
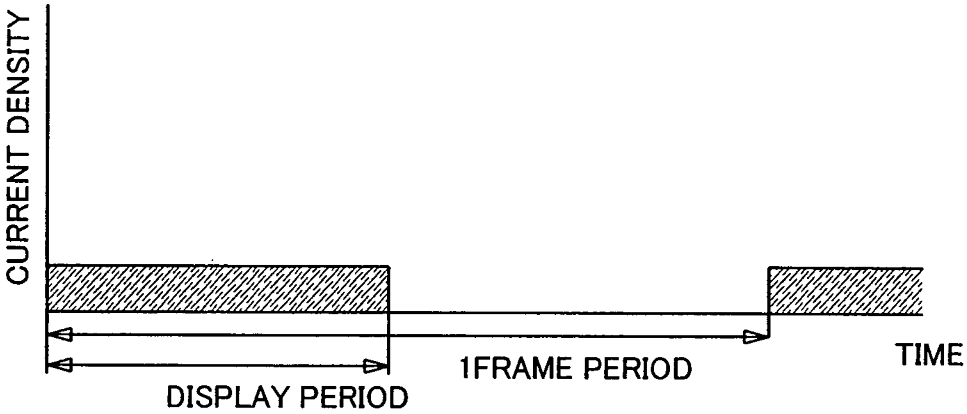
Fig. 3C OPTIMUM DUTY FACTOR

METHOD FOR DECIDING DUTY FACTOR IN DRIVING LIGHT-EMITTING DEVICE AND DRIVING METHOD USING THE DUTY FACTOR

BACKGROUND OF THE INVENTION

1. Field of the Invention

This invention relates to a method for deciding a duty factor and a driving method using the duty factor, in a light-emitting device in which a unit for supplying a current to a light-emitting element and a light-emitting element are provided in each of plural pixels. A light-emitting device includes a panel having a light-emitting element sealed therein, and a module in which IC and the like including a controller are mounted on the panel.

2. Description of the Related Art

In an active-matrix light-emitting device, the gradation is controlled by a video signal written into each pixel. Hereinafter, a method for driving a light-emitting device using an analog video signal will be described.

In the following example, a frame frequency of k is used. As shown in FIG. 12, when the frame frequency is k, k frame periods are provided in one second. A frame period is equivalent to a period during which a video signal is written to all the pixels and display of one screen is performed.

In each frame period, as an analog video signal is written to each pixel, the luminance of the light-emitting element of each pixel is controlled in accordance with image information held by the analog video signal, and the gradation is thus displayed. In writing an analog video signal to the pixels, a so-called point-sequential format for sequentially writing to each pixel, or a so-called line-sequential format for sequentially writing to each pixel of each line may be used. In both formats, a period during which an analog video signal is written to all the pixels is equivalent to a writing period Ta.

After the writing of an analog video signal ends, a holding period Ts starts and the luminance of the light-emitting element in each pixel is held until the frame period ends.

When the above-described driving method is used, the pixels perform display both in the writing period Ta and the holding period Ts. Therefore, depending on image information held by an analog video signal, the pixels may be constantly on, that is, the light-emitting elements of the pixels constantly emit light. A period during which actual display is performed is called display period.

In the case of the driving method shown in FIG. 12, the writing period Ta and the holding period Ts altogether form the display period.

Although in FIG. 12, one frame period is divided into the writing period Ta and the holding period Ts, it may be the writing period Ta alone without providing the holding period Ts. In short, immediately after an analog video signal is written to each pixel, the next frame period starts and writing of an analog video signal to each pixel is started again. Also in this case, the pixels may constantly be on, depending on image information held by an analog video signal. Therefore, in the case of this driving method, the writing period Ta itself is equivalent to the display period.

While display is performed both in the writing period Ta and the holding period Ts in FIG. 12, display may be performed only in the holding period Ts without performing display in the writing period Ta. In this case, all the pixels are off, that is, none of the light-emitting elements of the pixels emits light at all in the writing period Ta, irrespective of image information held by an analog video signal. Then, in the holding period, the luminance of the light-emitting elements is controlled in accordance with an analog video signal. Therefore, in the case of this driving method, the holding period Ts alone is equivalent to the display period.

Meanwhile, the problem in practical application of the light-emitting device is the short lifetime of the light-emitting element due to deterioration of its electroluminescence layer. FIG. 13 shows a change in luminance with the lapse of time with respect to a current flowing through the light-emitting element. As shown in FIG. 13, as the electroluminescence material deteriorates with the lapse of time, the luminance of the light-emitting element is lowered with respect to the current flowing through the light-emitting element.

The deterioration of the electroluminescence material is accelerated by moisture, oxygen, light and heat. Specifically, the rate of deterioration is affected by the structure of a device for driving the light-emitting device, the characteristics of the electroluminescence material, the material of electrodes, the conditions of preparation process, the method for driving the light-emitting device and the like.

Particularly, as a greater quantity of current flows through the light-emitting element, the light-emitting element deteriorates more quickly. When the light-emitting element deteriorates, the luminance of the light-emitting element is lowered even if the voltage applied to the electroluminescence layer is constant. As a result, a displayed image is unclear.

SUMMARY OF THE INVENTION

In view of the foregoing problem, it is an object of the present invention to restrain the deterioration of the light-emitting element and realize constant luminance, thus improving reliability.

The present inventors have found that the reliability of a light-emitting device varies depending on the duty factor of a display period in which each pixel performs display, in one frame period. The present inventors have also found a method for calculating an optimum duty factor for securing high reliability.

FIG. 1 shows the quantity of change in measured value of apparent luminance (standardized luminance) with the lapse of time for each duty factor, where the value at the beginning of light emission is assumed to be 100%. The luminance of the screen with a duty factor of 100% is 1000 cd. The apparent luminance at the beginning of light emission is the same for all the duty factors. That is, it can be assumed that the total quantity of the current (total quantity of electricity) flowing through the light-emitting element in one frame period is the same for all the duty factors.

In this specification, a light-emitting element (OLED: organic light-emitting diode) has a layer containing an electroluminescence material that generates electroluminescence as an electric field is applied thereon (hereinafter referred to as electroluminescence layer), an anode layer, and a cathode layer. The electroluminescence layer is provided between an anode and a cathode and is made up of a single layer or plural layers. These layers may contain an organic compound or an inorganic compound. The electroluminescence in the electroluminescence layer includes light emission (fluorescence) in returning from a singlet excited state to a ground state and light emission (phosphorescence) in returning from a triplet excited state to the ground state.

It can be seen from FIG. 1 that, with each duty factor, the standardized luminance at the beginning of light emission is higher than 100%, but the standardized luminance is then lowered as the light-emitting element deteriorates with the lapse of time. The largest decline in luminance is observed in the case the duty factor is 2.66%, followed by 100% and 72.6%. The least decline in standardized luminance is observed in the case the duty factor is 36%.

FIG. 2 shows data representing the value of standardized luminance with the lapse of time for different duty factors, using the data shown in FIG. 1. In FIG. 2, in order to clarify the graph, particularly data after two hours, 20 hours, 44.3 hours, 68.5 hours and 95.5 hours are typically shown, of the data shown in FIG. 1.

As shown in FIG. 2, the least decline in standardized luminance is observed and high luminance is held in the case the duty factor is 36%. It can be seen that the reliability is low in the case the duty factor 72.6% or 100%, which is too large, or 2.66%, which is too small. From this, it can be considered that an optimum duty factor that realizes high reliability is at around 36% in this case.

The present inventors have considered that such an optimum duty factor with high reliability exists because two phenomena occur for duty factors below and above the optimum range.

The case of a duty factor below the optimum range will now be reviewed.

To maintain constant apparent luminance on the screen, it is necessary to maintain a constant total quantity of electricity flowing through the light-emitting element in one frame period, irrespective of the duty factor. If the duty factor is small and the display period is short, as shown in FIG. 3A, the quantity of electricity passing in a unit time per unit area, that is, the so-called current density, increases.

FIG. 4A shows the relation between the current density and the luminance after X hours, where the duty factor is constant. As shown in FIG. 4A, luminance of the light-emitting element decreases as the current density increases. This is thought that the total electric charge increases as the current density increases. For more detail, the luminance of the light-emitting device shows a sharp decline when the current density exceeds a certain value. This phenomenon can not be explained merely by the increase of the total electric charge. From the above phenomenon, the present inventors thought that the luminance of the light-emitting device decreases because the light-emitting device deteriorates when the current density exceeds a certain value even if the total electric charge is kept constant. Therefore, it can be considered that if the duty factor is made too small while constant apparent luminance on the screen is maintained, the current density increases and the decline in luminance of the light-emitting element increases.

Next, the case of a duty factor above the optimum range will be reviewed.

If the duty factor increases while the total quantity of electricity in one frame period is fixed in order to maintain constant apparent luminance on the screen, the current density is reduced and the display period is extended, as shown in FIG. 3B.

FIG. 4B shows the relation between the duty factor and the luminance after X hours, where the current density is constant. As shown in FIG. 4B, luminance of the light-emitting element decreases as the duty factor increases. This is thought that the total electric charge increases as the duty factor increases. For more detail, the luminance of the light-emitting device shows a sharp decline when the duty factor exceeds a certain values. This phenomenon can not be explained merely by the increase of the total electric charge. From the above phenomenon, the present inventors thought that the luminance of the light-emitting device decreases because the light-emitting device deteriorates when the duty factor exceeds a certain value even if the total electric charge is kept constant. So if the duty factor is increased keeping the subjective luminance of the display device constant, the luminance of the light-emitting device decreases remarkably because the period of continuously emitting light in one frame is lengthened.

There are various reasons for the acceleration of deterioration of the light-emitting element in a long display period. However, heat generated in the light-emitting element can be considered to be one reason for the acceleration of deterioration. It may also be considered that ionic impurities existing in the electroluminescence layer concentrate at one electrode and thus create a region having lower resistance than the other regions in the electroluminescence layer, and that a current actively flows through that low-resistance region, thus accelerating the deterioration.

In this way, it can be considered that at least the above-described two phenomena are related to the decline in luminance of the light-emitting element.

The total quantity of electricity flowing through the light-emitting element of one pixel in one frame period is equivalent to the product of the display period determined by the duty factor, and the current density. Thus, when the frame frequency is fixed, the product of the luminance after X hours of FIGS. 4A and 4B is found, where the value of the current density represented by the horizontal axis in FIG. 4A and the value of the duty factor represented by the horizontal axis in FIG. 4B correspond to each other so that the total quantity of electricity is constant. FIG. 4C shows the luminance after X hours in relation to the duty factor and the current density in the case the total quantity of electricity is constant. The vertical axis in FIG. 4C represents the product of the luminance after X hours of FIGS. 4A and 4B.

As shown in FIG. 4C, the product of the luminance after X hours in relation to the duty factor or the current density in the case the total quantity of electricity is constant has one maximum value. It can be considered that the highest reliability is realized by driving with the duty factor at which the maximum value is obtained. The range of the duty factor that enables realization of high reliability may be such that the luminance exceeds approximately 0.8 times the maximum value. For example, if the maximum value of the luminance is 50% of the initial luminance after 95.5 hours, the range of the optimum duty factor can include the luminance exceeding approximately 40% of the initial luminance.

Although the graph shown in FIG. 4A is ascendant toward the right, the smaller the duty factor is, the smaller the quantity of decline in luminance is. Therefore, the shape of the graph changes. Moreover, though the graph shown in FIG. 4B is descendant toward the right, the higher the current density is, the larger the quantity of decline in luminance is. Therefore, the shape of the graph changes.

However, if the total quantity of electricity, which is equivalent to the product of the display period determined by the duty factor of the graph shown in FIG. 4A and the current density of the graph shown in FIG. 4B, is kept constant, one specific characteristic can be obtained as shown in FIG. 3C.

As driving is performed using the optimum duty factor, deterioration of the light-emitting element can be restrained to provide constant luminance, and the reliability of the light-emitting device can be improved.

The value of the optimum duty factor varies depending on the structure of the light-emitting element. However, each time, the range of the optimum duty factor can be defined from the product of the luminance after X hours in relation to the duty factor or the current density in the case the total quantity of electricity is constant.

For example, in view of the data shown in FIG. 1, if the light-emitting element used for acquiring the data shown in FIG. 1 is used and the reliability after 95.5 hours based on the initial luminance of 1000 cd is used as a reference, a value within a range of more than 20% and less than 50% (preferably more than 30% and less than 40%) can be used as an optimum value of duty factor.

The total quantity of electricity flowing through one pixel in one frame period also changes depending on image information held by an analog video signal. Since the light-emitting element deteriorates more significantly as the total quantity of electricity increases, it is desired to define the range of the optimum duty factor based on the case of the largest total quantity of electricity, irrespectively of image information.

By thus performing driving with an optimum duty factor, it is possible to restrain deterioration of the light-emitting element, realize constant luminance, and improve the reliability of the light-emitting device.

BRIEF DESCRIPTION OF THE DRAWINGS

FIG. 1 shows measured values of changes in luminance of a light-emitting element with the lapse of time.

FIG. 2 shows measured values representing the relation between the duty factor and luminance.

FIGS. 3A to 3C show the relation between the duty factor and the current density.

DETAILED DESCRIPTION OF THE PREFERRED EMBODIMENTS

In the following embodiments, a driving method using an optimum duty factor will be described.

Embodiment 1

In this embodiment, the driving method of the present invention will be described with reference to a light-emitting device that controls light emission of a light-emitting element using two thin film transistors (TFTs) provided in each pixel.

Figure 4A:
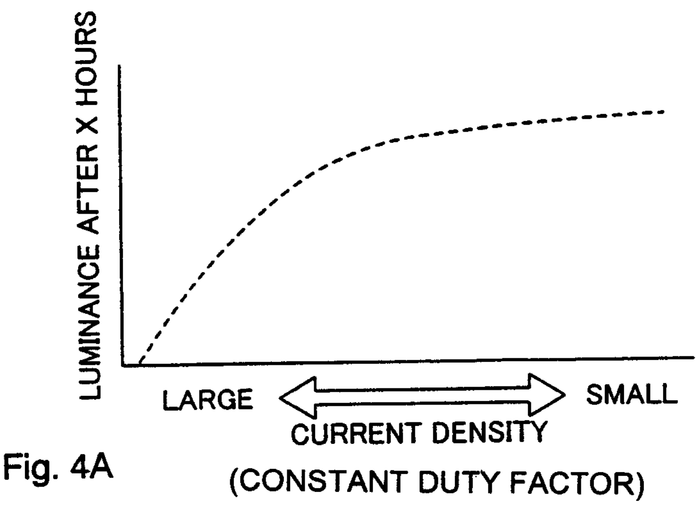
FIGS. 4A to 4C are graphs showing the luminance of a light-emitting element after X hours under various conditions.
Figure 4B:
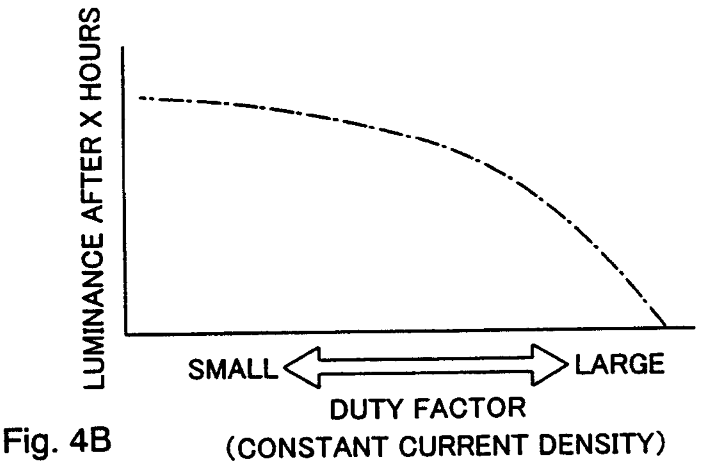
Figure 4C:
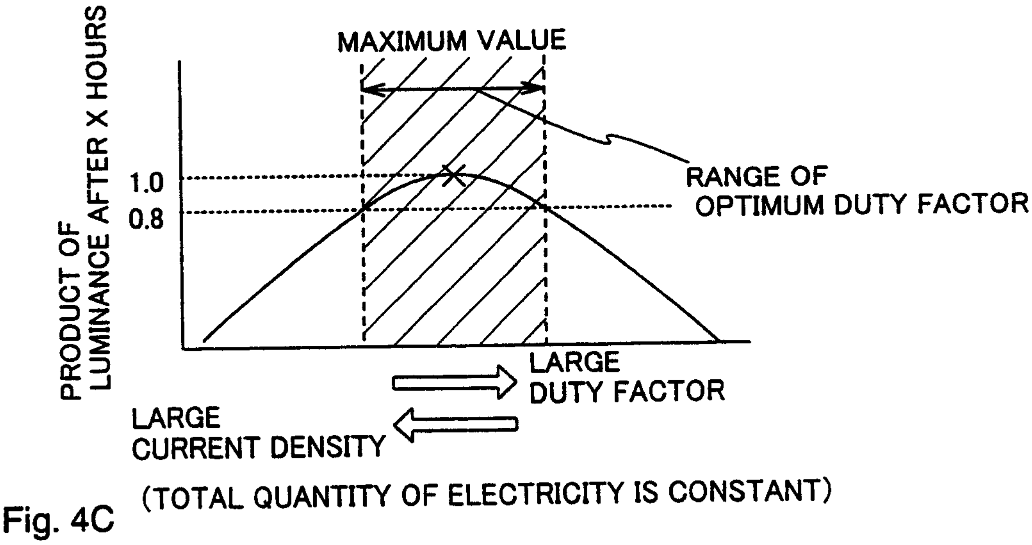
Figure 5A:
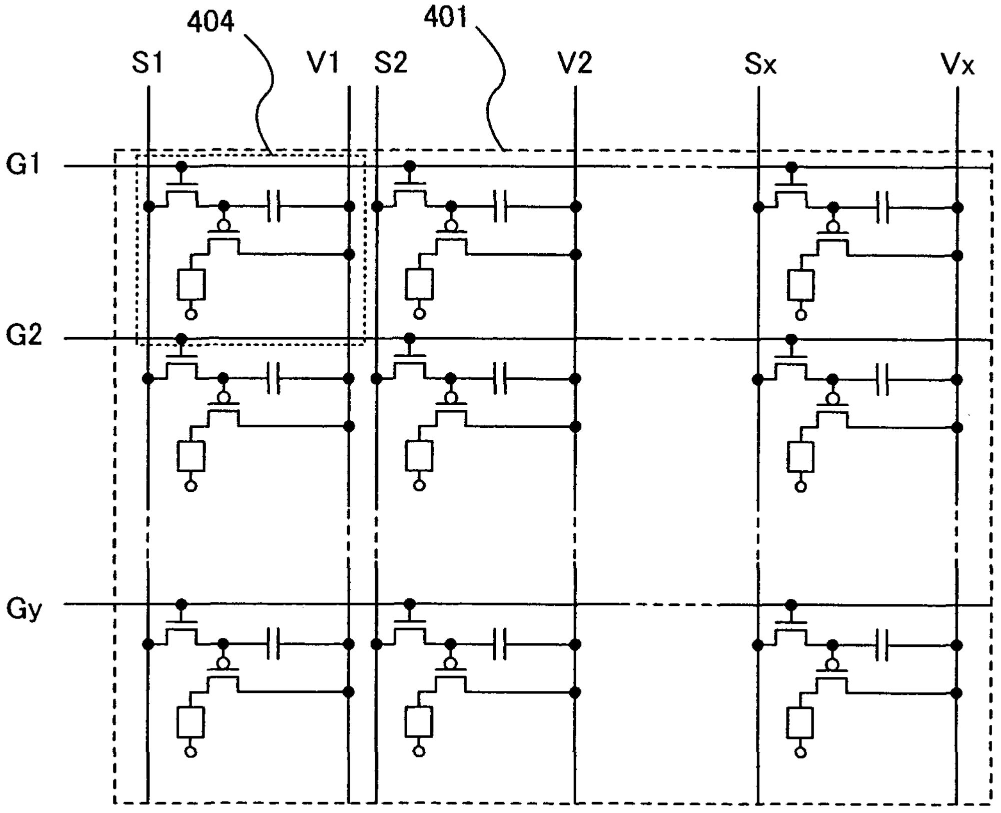
FIGS. 5A and 5B are circuit diagrams of a pixel and a pixel part of a light-emitting device.

FIG. 5A shows a circuit diagram of a pixel part of the light-emitting device using the driving method of the present invention. In a pixel part 401, signal lines (S1 to Sx), power lines (V1 to Vx) and scanning lines (G1 to Gy) are provided.

In the case of this embodiment, a region having one of the signal lines (S1 to Sx), one of the power lines (V1 to Vx) and one of the scanning lines (G1 to Gy) is equivalent to a pixel 404. In the pixel part 401, plural pixels 404 are arranged in the form of a matrix.

Figure 5B:
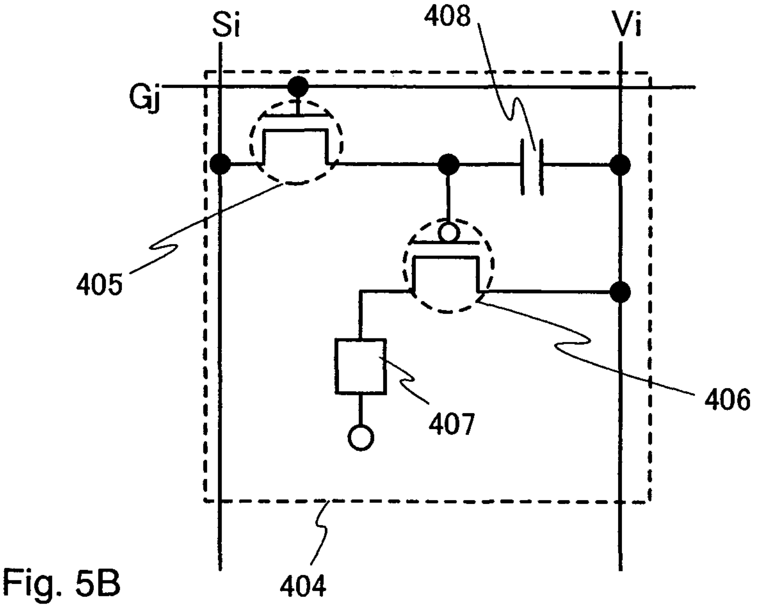

FIG. 5B shows an enlarged view of the pixel 404. In FIG. 5B, 405 represents a switching TFT. The gate of the switching TFT 405 is connected to the scanning line Gj (where j is 1 to y). Of the source and drain of the switching TFT 405, one is connected to the signal line Si (where i is 1 to x) and the other is connected to the gate of a driving TFT 406.

In this specification, connection means electrical connection unless it is described otherwise.

Of the source and drain of the driving TFT 406, one is connected to the power line Vi (where i is 1 to x) and the other is connected to the pixel electrode of a light-emitting element 407.

The light-emitting element 407 includes an anode, a cathode, and an electroluminescence layer provided between the anode and the cathode. In the case the anode is connected with the source or drain of the driving TFT 406, the anode is the pixel electrode and the cathode is the counter-electrode. On the other hand, in the case the cathode is connected with the source or drain of the driving TFT 406, the cathode is the pixel electrode and the anode is the counter-electrode.

In the case the source or drain of the driving TFT 406 is connected to the anode of the light-emitting element 407, it is desired that the driving TFT 406 is a p-channel TFT. On the other hand, in the case the source or drain of the driving TFT 406 is connected to the cathode of the light-emitting element 407, it is desired that the driving TFT 406 is an n-channel TFT.

A voltage from a power source is applied to the counter-electrode of the light-emitting element 407 and the power line Vi. In this specification, voltage means the potential difference from the ground voltage unless it is described otherwise.

Of two electrodes of holding capacitance 408, one is connected to the power line Vi and the other is connected to the gate of the driving TFT 406. The holding capacitance 408 is provided for holding the gate voltage of the driving TFT 406 when the switching TFT 405 is in a non-selection state (off-state). While the holding capacitance 408 is provided in the structure shown in FIG. 5B, the present invention is not limited to this structure and a structure having no holding capacitance 408 may be used.

The driving method of the present invention, used in the light-emitting device shown in FIGS. 5A and 5B, will now be described with reference to FIG. 6.

Figure 6:
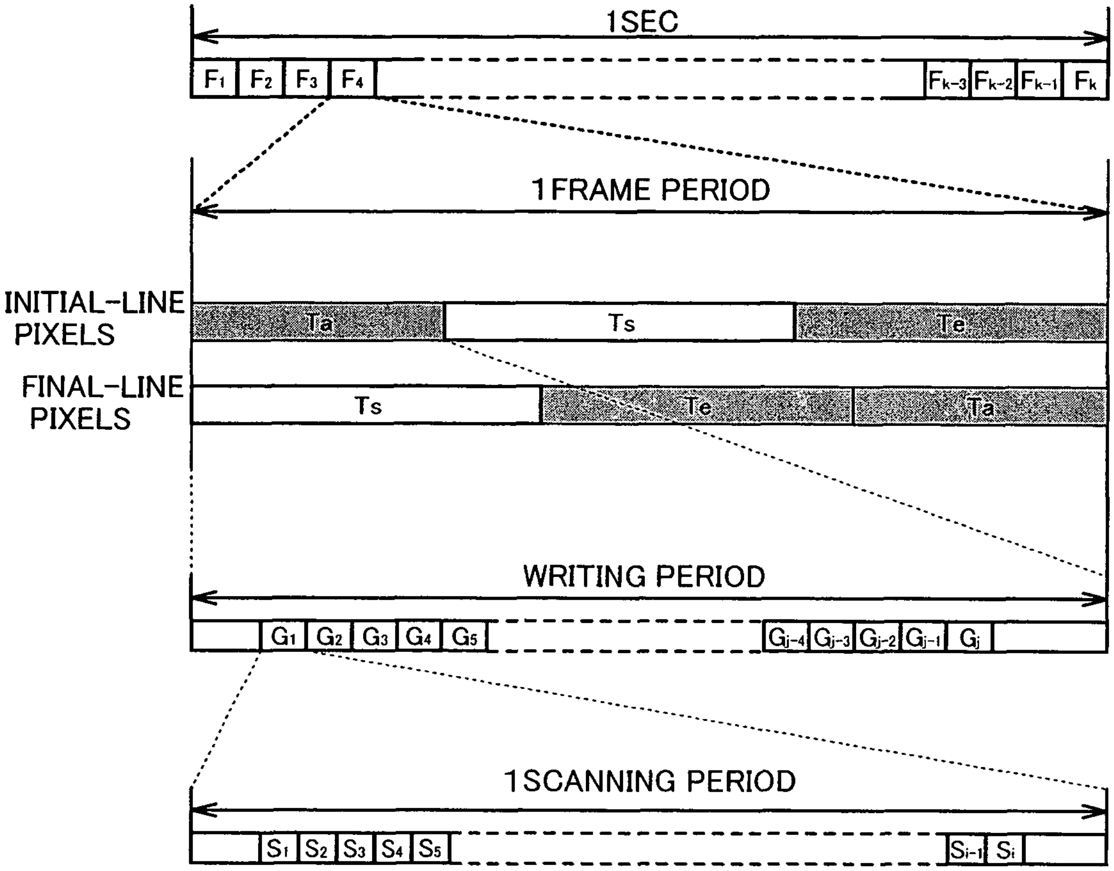
FIG. 6 shows a driving method of the present invention in the light-emitting device shown in FIGS. 5A and 5B.

As shown in FIG. 6, when the frame frequency is k, k frame periods exist in one second. To restrain flicker on the screen or the like, it is desired that k is 60 or more.

In the driving method shown in FIG. 6, a writing period Ta, a holding period Ts, and a non-display period Te are provided in one frame period. FIG. 6 typically shows the timing at which a display period and a non-display period appear with respect to pixels (initial-line pixels) of a line where an analog video signal is inputted first and pixels of a line where an analog video signal is inputted last.

The specific operation of the pixels will now be described. In the writing period Ta, the same voltage as the voltage applied to the power lines is applied to the counter-electrodes of the light-emitting elements 407. Alternatively, the voltage difference between the counter-electrodes and the power lines may be controlled so that a reverse-bias voltage is applied to the light-emitting elements.

Then, in the writing period Ta, the scanning lines GI to Gy are sequentially selected. The periods when the respective scanning lines are selected do not overlap each other. For example, when the scanning line Gj (1 to y) is selected, all the switching TFTs 405 with their gates connected with the scanning line Gj are turned on. Then, an analog video signal sequentially inputted to the signal lines S1 to Sx is inputted to the gates of the driving TFTs 406 via the switching TFTs 405.

Although FIG. 6 shows the case where an analog video signal is sequentially inputted to the signal lines S1 to Sx, the analog video signal may be simultaneously inputted to the signal lines S1 to Sx.

Then, the gate voltage of the driving TFTs 406 defined by the analog video signal is held by the holding capacitance 408. In this embodiment, since the same voltage as the voltage applied to the power lines is applied to the counter-electrodes or the voltage difference between the counter-electrodes and the power lines is controlled so that a reverse-bias voltage is applied to the light-emitting elements in the writing period Ta, none of the light-emitting elements 407 of all the pixels emits light irrespective of the switching of the driving TFTs 406.

On completion of the selection of all the scanning lines G1 to Gy, the writing period Ta ends and the holding period Ts starts.

In the holding period Ts, a predetermined voltage difference is provided between the counter-electrodes and the power lines so that a forward-bias voltage is applied to the light-emitting elements when the driving TFTs are on. Then, simultaneously in all the pixels, the ON-state current of the driving TFT is controlled by the gate voltage held by the holding capacitance 408, and the light emission of the light-emitting element 407 is controlled by the ON-state current.

As the holding period Ts ends, the non-display period Te starts. In the non-display period Te, similarly to the writing period Ta, the same voltage as the voltage applied to the power lines is applied to the counter-electrodes of the light-emitting elements 407. Alternatively, the voltage difference between the counter-electrodes and the power lines may be controlled so that a reverse-bias voltage is applied to the light-emitting elements. Therefore, the light-emitting elements 407 of all the pixels simultaneously enter a non-emission state and all the pixels are turned off.

As the non-display period Te ends, one frame period ends and display of one screen can be performed. Then, the next frame period starts, and the writing period Ta, the holding period Ts and the non-display period Te appear again.

In the driving method shown in FIG. 6, in the writing period Ta and the non-display period Te, all the pixels are forced to stop emitting light and perform no display. The pixels perform display only in the holding period, which is equivalent to a display period.

In the driving method of the present invention, the duty factor must fall within an optimum range. In the case of the driving method shown in FIG. 6, the duty factor can be controlled to fall within an optimum range by adjusting the duration of the writing period Ta or the non-display period Te. By thus performing the driving with an optimum duty factor, it is possible to restrain deterioration of the light-emitting elements, realize constant luminance, and improve the reliability of the light-emitting device.

The optimum duty factor varies, depending on the apparent luminance of the light-emitting elements in initial light emission, that is, depending on the value of the total quantity of electricity flowing through one pixel in one frame period. The total quantity of electricity flowing in one frame period may be based on the state where the pixels have the highest gradation or may be based on the gradation decided by an operator. Alternatively, an optimum duty factor may be found each time in accordance with the structure of the light-emitting elements.

Embodiment 2

In this embodiment, the driving method of the present invention will be described with reference to a light-emitting device that controls light emission of a light-emitting element using three TFTs provided in each pixel.

Figure 7A:
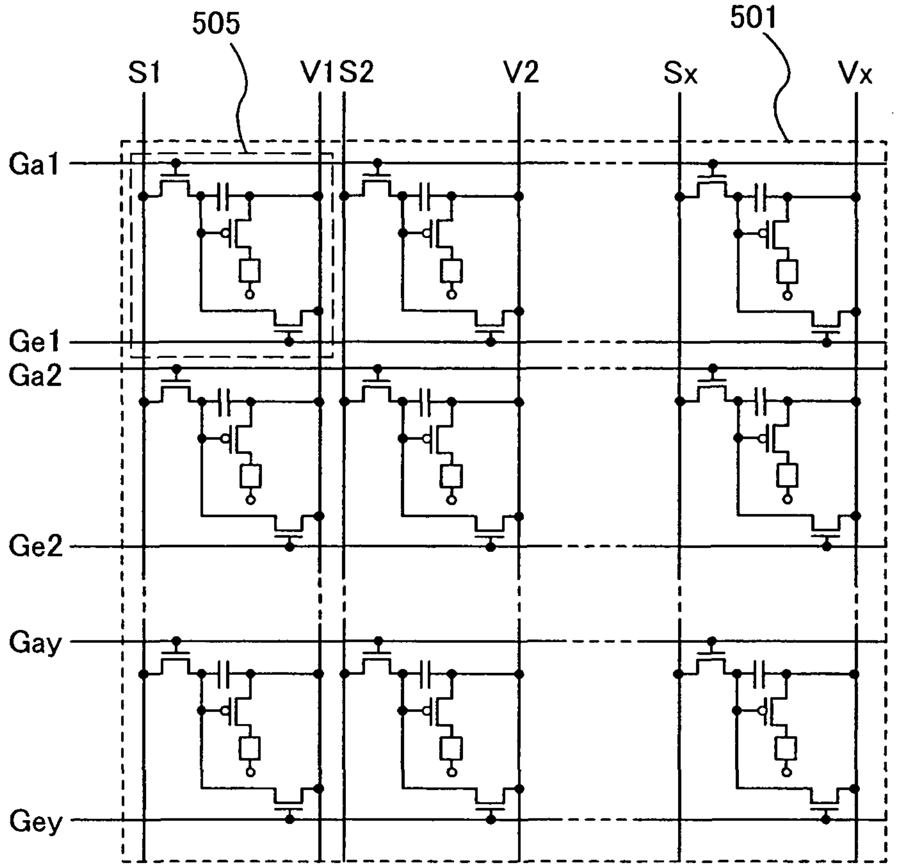
FIGS. 7A and 7B are circuit diagrams of a pixel and a pixel part of a light-emitting device.

FIG. 7A shows a circuit diagram of a pixel part of the light-emitting device using the driving method of the present invention. In FIG. 7A, signal lines (S1 to Sx), power lines (V1 to Vx), first scanning lines (Ga1 to Gay), and second scanning lines (Ge1 to Gey) are provided in a pixel part 501.

A region having one of the signal lines (Si to Sx), one of the power lines (V1 to Vx), one of the first scanning lines (Ga1 to Gay) and one of the second scanning lines (Ge1 to Gey) is equivalent to a pixel 505. In the pixel part 501, plural pixels 505 are arranged in the form of a matrix.

Figure 7B:
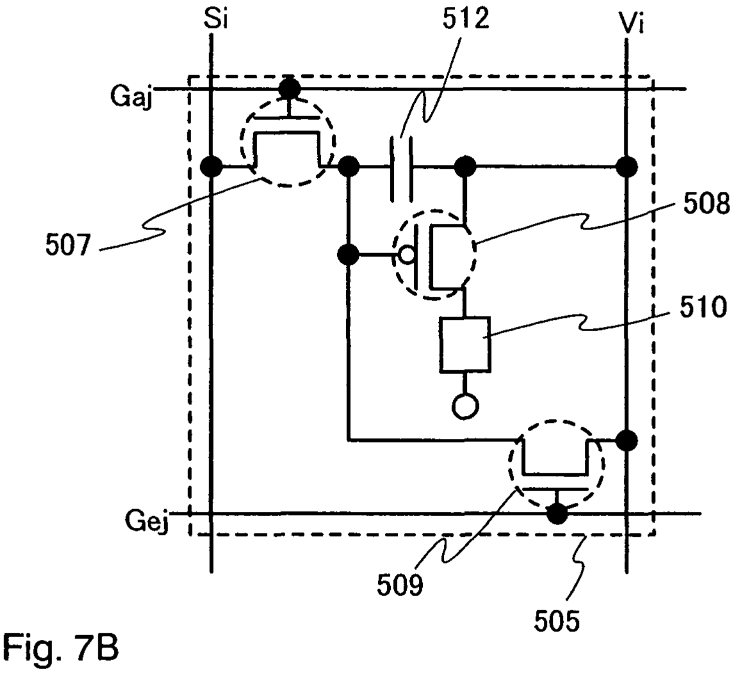

FIG. 7B shows an enlarged view of the pixel 505. In FIG. 7B, 507 represents a switching TFT. The gate of the switching TFT 507 is connected to the first scanning line Gaj (where j is 1 to y). Of the source and drain of the switching TFT 507, one is connected to the signal line Si (where i is 1 to x) and the other is connected to the gate of a driving TFT 508.

The gate of an erasure TFT 509 is connected to the second scanning lines Gej (where j is 1 to y). Of the source and drain of the erasure TFT 509, one is connected to the power line Vi (where i is 1 to x) and the other is connected to the gate of the driving TFT 508.

Of the source and drain of the driving TFT 508, one is connected to the power line Vi and the other is connected to the pixel electrode of a light-emitting element 510.

The light-emitting element 510 includes an anode, a cathode, and an electroluminescence layer provided between the anode and the cathode. In the case the anode is connected with the source or drain of the driving TFT 508, the anode is the pixel electrode and the cathode is the counter-electrode. On the other hand, in the case the cathode is connected with the source or drain of the driving TFT 508, the cathode is the pixel electrode and the anode is the counter-electrode.

In the case the anode is the pixel electrode, it is desired that the driving TFT 508 is a p-channel TFT. On the other hand, in the case the cathode is the pixel electrode, it is desired that the driving TFT 508 is an n-channel TFT.

A voltage from a power source is applied to the counter-electrode of the light-emitting element 510 and the power line Vi. The voltage difference between the counter-electrode and the power line is held at such a value that a forward-bias voltage is applied to the light-emitting element when the driving TFT is turned on.

Of two electrodes of holding capacitance 512, one is connected to the power line Vi and the other is connected to the gate of the driving TFT 508. The holding capacitance 512 is provided for holding the gate voltage of the driving TFT 508 when the switching TFT 507 is in a non-selection state (off-state). While the holding capacitance 512 is provided in the structure shown in FIG. 7B, the present invention is not limited to this structure and a structure having no holding capacitance 512 may be used.

The driving method of the present invention, used in the light-emitting device shown in FIGS. 7A and 7B, will now be described with reference to FIG. 8. The horizontal axis represents time and the vertical axis represents the positions of the first and second scanning lines. A writing period Ta, a holding period Ts, and a non-display period Te appear in each frame period.

In the writing period Ta, the first scanning lines Gal to Gay are sequentially selected in such a manner that the period when the respective first scanning lines are selected do not overlap each other. For example, when the first scanning line Gaj (1 to y) is selected, all the switching TFTs 507 with their gates connected with the first scanning line Gaj are turned on. Then, an analog video signal sequentially or simultaneously inputted to the signal lines S1 to Sx is inputted to the gates of the driving TFTs 508 via the switching TFTs 507.

Then, the ON-state current of the driving TFTs 508 is controlled in accordance with image information held by the analog video signal, and the luminance of the light-emitting elements is controlled by the ON-state current. In this manner, in this embodiment, the holding period Ts starts and display starts sequentially in the pixels where the analog video signal has been written.

The writing period Ta is equivalent to a period until the selection of all the first scanning lines Gal to Gay is completed. The holding period Ts starts independently in each pixel when writing of the analog video signal ends. Therefore, in this embodiment, the writing period Ta and the holding period Ts of each pixel overlap each other, as shown in FIG. 8.

As the holding period Ts ends, the non-display period Te starts. As the non-display period Te starts, the second scanning lines Ge1 to Gey are sequentially selected.

When the second scanning line Gej is selected, all the erasure TFTs 509 with their gates connected with the second scanning line Gej are turned on. The voltage of the power lines V1 to Vx is applied to the gates of the driving TFTs 508 via the erasure TFTs 509.

As the voltage of the power lines is applied to the gates of the driving TFTs 508, the gate and source of each driving TFT 508 have continuity. Therefore, the gate voltage becomes 0 V and the driving TFTs 508 are turned off. The light-emitting elements 510 enter a non-emission state and the pixels of this line are forced to end display.

As all the display periods end, one frame period ends and one image can be displayed. The pixels described in this embodiment can be driven at a desired duty factor by adjusting the duration of the non-display period.

Figure 8:
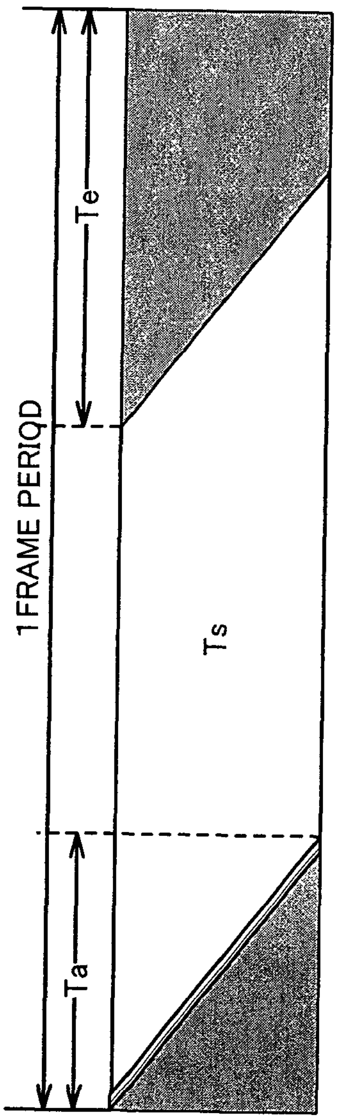
FIG. 8 shows a driving method of the present invention in the light-emitting device shown in FIGS. 7A and 7B.

In the driving method shown in FIG. 8, in the writing period Ta and the non-display period Te, all the pixels are in the non-emission state and perform no display. The pixels perform display only in the holding period Ts, which is equivalent to a display period.

In the driving method shown in FIG. 8, if the writing periods Ta of the adjacent frame periods do not overlap each other, the duration of the display period can be made shorter than the writing period Ta. The non-display periods Te may or may not overlap each other.

By using the driving methods described in Embodiments 1 and 2, it is possible to perform driving at an optimum duty factor, thus restraining deterioration of the light-emitting elements and improving the reliability of the light-emitting device.

In the light-emitting device using the driving method of the present invention, it suffices to have a duty factor within an optimum range, and the device is not limited to the structures described in Embodiments 1 and 2.

EXAMPLES

Hereinafter, examples of the present invention will be described.

Example 1

In this example, a driving method other than the driving method described in Embodiment 1, for the light-emitting device shown in FIGS. 5A and 5B, will be described.

One driving method of this example will now be described with reference to FIG. 9A. The horizontal axis represents time, and the vertical axis represents the position of the scanning lines. In the driving method shown in FIG. 9A, a writing period Ta, a holding period Ts, and a non-display period Te are provided in one frame period. These periods appear in an order that is different from that of the driving method described in Embodiment 1.

The specific operation of the pixels will be described. In the writing period Ta, similarly to Embodiment 1, the same voltage as the voltage applied to the power lines is applied to the counter-electrodes of the light-emitting elements 407. Alternatively, the voltage difference between the counter-electrodes and the power lines may be controlled so that a reverse-bias voltage is applied to the light-emitting elements.

Then, the scanning lines G1 to Gy are sequentially selected and all the lo switching TFTs 405 with their gates connected with the scanning lines are turned on. The gate voltage of the driving TFTs 406 is defined by an analog video signal sequentially or simultaneously inputted to the signal lines S1 to Sx and is held by the holding capacitance 408.

In the writing period Ta, since the same voltage as the voltage applied to the power lines is applied to the counter-electrodes or the voltage difference between the counter-electrodes and the power lines is controlled so that a reverse-bias voltage is applied to the light-emitting elements, none of the light-emitting elements 407 of all the pixels emits light irrespective the switching of the driving TFTs 406.

Figure 9A:
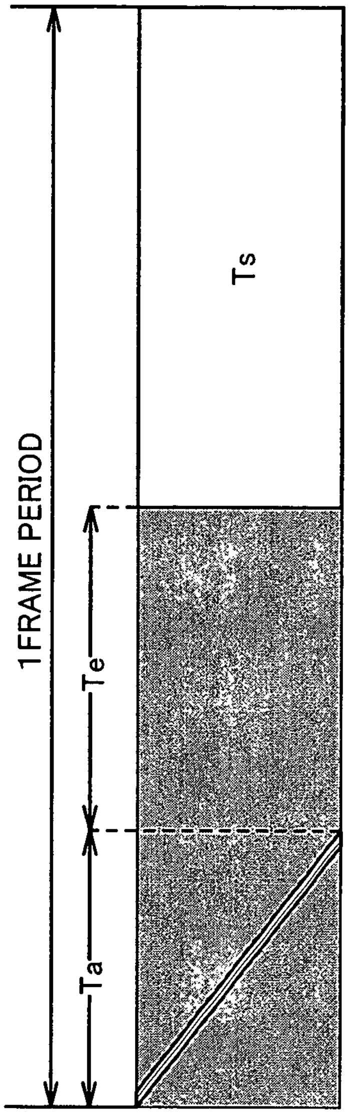
FIGS. 9A and 9B show an embodiment of the driving method of the present invention in the light-emitting device shown in FIGS. 5A and 5B.

In the driving method shown in FIG. 9A, on completion of the selection of all the scanning lines G1 to Gy, the non-display period Te starts.

In the non-display period Te, the gate voltage of the driving TFTs 406 defined by the analog video signal is held by the holding capacitance 408. Similarly to the writing period Ta, since the same voltage as the voltage applied to the power lines is applied to the counter-electrode or the voltage difference between the counter-electrodes and the power lines is controlled so that a reverse-bias voltage is applied to the light-emitting elements, none of the light-emitting elements 407 of all the pixels emits light and all the pixels are off, irrespective of the switching of the driving TFTs 406.

As the non-display period Te ends, the holding period Ts starts. In the holding period Ts, a predetermined voltage difference is provided between the counter-electrodes and the power lines so that a forward-bias voltage is applied to the light-emitting elements 407 when the driving TFTs 406 are on. Then, simultaneously in all the pixels, the ON-state current of the driving TFT is controlled by the gate voltage held by the holding capacitance 408, and the light emission of the light-emitting element 407 is controlled by the ON-state current.

As the holding period Ts ends, one frame period ends and display of one screen can be performed. Then, the next frame period starts, and the writing period Ta, the non-display period Te and the holding period Ts appear again.

In the driving method shown in FIG. 9A, in the writing period Ta and the non-display period Te, all the pixels are forced to stop emitting light and perform no display. The pixels perform display only in the holding period Ts, which is equivalent to a display period.

In the driving method of the present invention, the duty factor must fall within an optimum range. In the case of the driving method shown in FIG. 9A, the duty factor can be controlled to fall within an optimum range by adjusting the duration of the writing period Ta, the holding period Ts or the non-display period Te. By thus performing driving with an optimum duty factor, it is possible to restrain deterioration of the light-emitting elements, realize constant luminance, and improve the reliability of the light-emitting device.

Another driving method of this example will now be described with reference to FIG. 9B. The horizontal axis represents time, and the vertical axis represents the position of the scanning lines. In the driving method shown in FIG. 9B, the way to control the voltage difference between the counter-electrodes and the power lines in the writing period Ta is different from that of the driving method described in Embodiment 1.

In the writing period Ta, a predetermined voltage difference is provided between the counter-electrodes and the power lines so that a forward-bias voltage is applied to the light-emitting elements when the driving TFTs are on. Then, the scanning lines G1 to Gy are sequentially selected and all the switching TFTs 405 with their gates connected with the scanning lines are turned on. The gate voltage of the driving TFTs 406 is defined by an analog video signal sequentially or simultaneously inputted to the signal lines S1 to Sx and is held by the holding capacitance 408.

The ON-state current of the driving TFTs 406 is controlled in accordance with image information held by the analog video signal, and the luminance of the light-emitting elements 407 is controlled by the ON-state current. In this manner, in the driving method shown in FIG. 9B, the holding period Ts starts and display starts sequentially in the pixels where the analog video signal has been written.

On completion of the selection of all the scanning lines G1 to Gy, the writing period Ta ends. The holding period starts when the writing of the analog video signal ends in each pixel. Therefore, in the driving method shown in FIG. 9B, the writing period Ta and the holding period Ts of each pixel overlap each other.

As the holding period Ts ends, the non-display period Te starts. In the non-display period Te, the same voltage as the voltage applied to the power lines is applied to the counter-electrodes of the light-emitting elements 407. Alternatively, the voltage difference between the counter-electrodes and the power lines may be controlled so that a reverse-bias voltage is applied to the light-emitting elements. Therefore, the light-emitting elements 407 of all the pixels simultaneously enter a non-emission state and all the pixels are turned off.

As the non-display period Te ends, one frame period ends and display of one screen can be performed. Then, the next frame period starts, and the writing period Ta, the holding period Ts and the non-display period Te appear again.

Figure 9B:
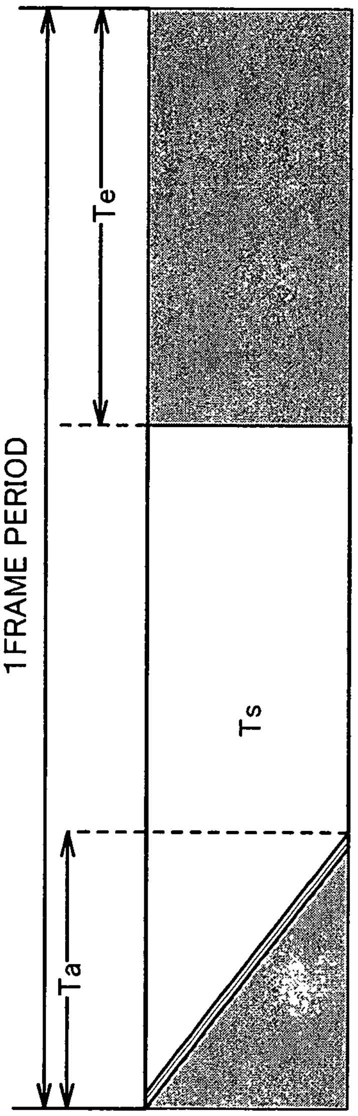

In the driving method shown in FIG. 9B, in the non-display period Te, all the pixels are forced to stop emitting light and perform no display. The pixels perform display only in the writing period Ta and the holding period Ts, which are equivalent to a display period.

In the case of the driving method shown in FIG. 9B, the writing period Ta needs to be shorter than the holding period Ts in the pixel where the analog signal is written first. Moreover, in the case of the driving method shown in FIG. 9B, it is desired that the duration of the writing period Ta is shorter, in order to reduce the difference in duration between the holding period Ts in the pixel where the analog signal is written first and the holding period Ts in the pixel where the analog signal is written last.

In the driving method of the present invention, the duty factor must fall within an optimum range. In the case of the driving method shown in FIG. 9B, the duty factor can be controlled to fall within an optimum range by adjusting the duration of the writing period Ta, the holding period Ts or the non-display period Te. By thus performing driving with an optimum duty factor, it is possible to restrain deterioration of the light-emitting elements, realize constant luminance, and improve the reliability of the light-emitting device.

In the case of the driving method shown in FIG. 9B, since the holding period Ts in the pixel where the analog signal is written first and the holding period Ts in the pixel where the analog signal is written last differ in duration, the duty factor differs, too. Therefore, the duty factor must fall within an optimum range in all the pixels shown in FIG. 9B.

Example 2

In this example, the detailed structures of a signal line driving circuit and a scanning line driving circuit, used for driving the light-emitting device shown in FIGS. 5A and 5B or FIGS. 7A and 7B, will be described.

Figure 10A:
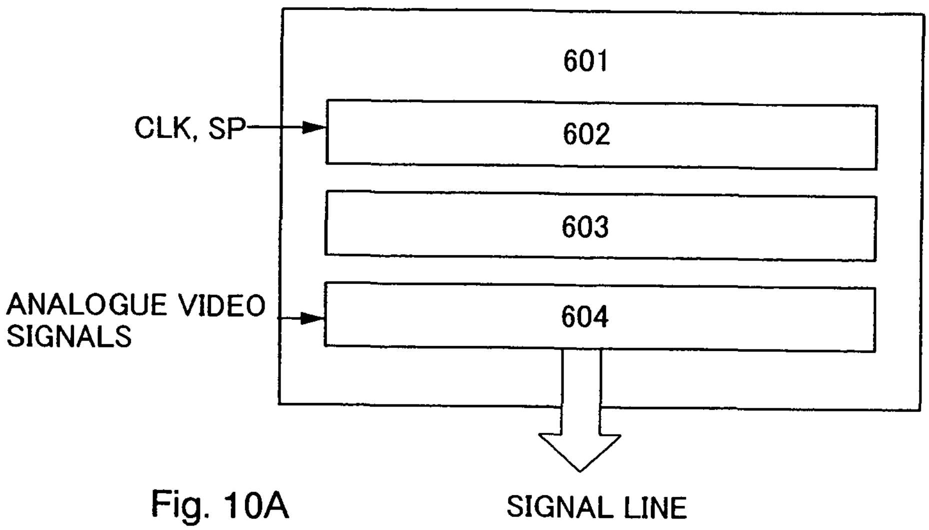
FIGS. 10A and 10B are block diagrams of driving circuits.
Figure 10B:
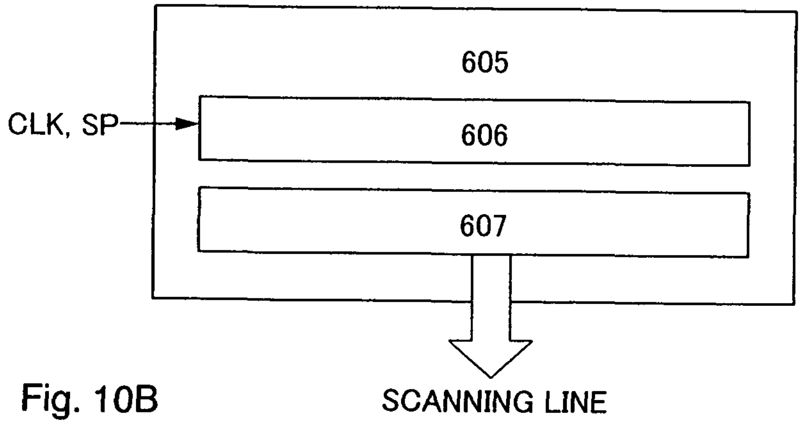

FIGS. 10A and 10B show exemplary driving circuits of the light-emitting device, in the form of block diagrams.

A signal line driving circuit 601 shown in FIG. 10A has a shift register 602, a level shifter 603, and a sampling circuit 604. The level shifter may be used when necessary, and it need not necessarily be used. While the level shifter 603 is provided between the shifter register 602 and the sampling circuit 604 in this example, the present invention is not limited to this structure. The level shifter 603 may be incorporated in the shift register 602.

When a clock signal (CLK) and a start pulse signal (SP) are supplied to the shift register 602, the shift register 602 generates a timing signal for controlling the timing of sampling a video signal. The generated timing signal has its voltage amplitude amplified by the level shifter 603 and is then inputted to the sampling circuit 604. The video signal inputted to the sampling circuit 604 is sampled synchronously with the timing signal inputted to the sampling circuit 604 and is inputted to the corresponding signal line.

A scanning line driving circuit 605 shown in FIG. 10B has a shifter register 606 and a buffer 607. It may also have a level shifter, if necessary.

In the scanning line driving circuit 605, a timing signal from the shift register 606 is supplied to the buffer 607 and then supplied to the corresponding scanning line (or first or second scanning line). The scanning line is connected with the gates of the switching TFTs (or erasure TFTs) of the pixels of one line. As the switching TFTs (or erasure TFTs) of the pixels of one line must be simultaneously turned on, a buffer that can supply a large current is used.

In practice, this example can be freely combined with Example 1.

Example 3

In this example, the structure of and the preparation method for the light-emitting element used for obtaining data shown in FIGS. 1 and 2 will be described.

Figure 11:
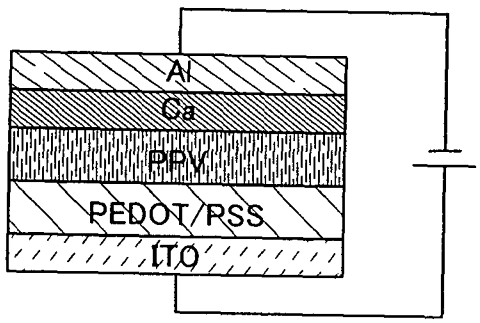
FIG. 11 shows the structure of a light-emitting element used for measurement.
Figure 12:
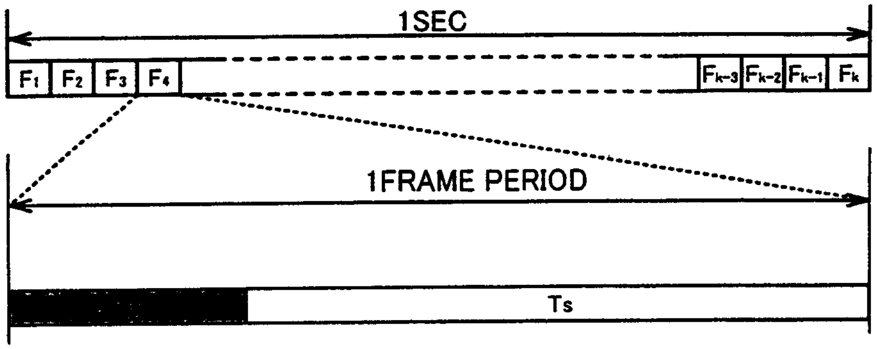
Fig. 12 PRIOR ART
FIG. 12 shows a method for driving a typical light-emitting device in the case an analog video signal is used.
Figure 13:
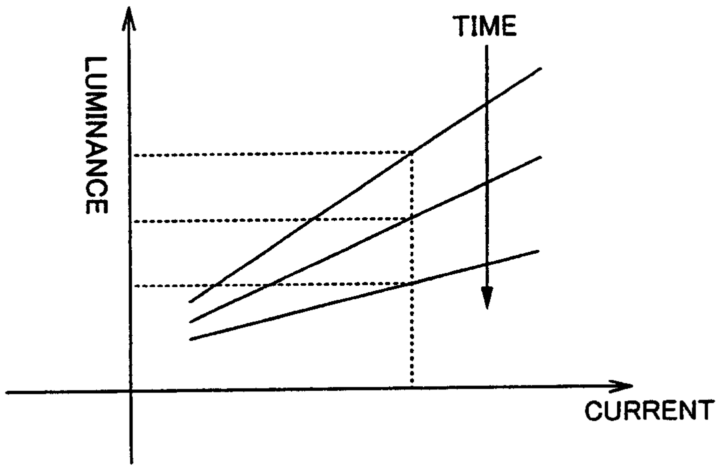
Fig. 13 PRIOR ART
FIG. 13 shows the state of deterioration in luminance of the light-emitting element.

FIG. 11 shows the structure of the light-emitting element used in the measurement for obtaining the data of FIGS. 1 and 2. The light-emitting element shown in FIG. 11 uses ITO as a pixel electrode and uses a cathode including a conductive film made of Ca and a conductive film made of Al. Its electroluminescence layer includes a light-emitting layer made of a PPV-based electroluminescence material exhibiting yellow light emission, and a hole injection layer prepared by applying a poly(ethylenedioxythiophene)/poly(styrenesulfonic acid) solution (PEDOT/PSS).

The preparation method will now be described specifically. After a transparent conductive film of ITO is spin-coated with the PEDOT/PSS solution at 1500 rpm, it is baked at 100° C. at a normal pressure for 10 minutes and then baked at 80° C. in a vacuum atmosphere for 10 minutes. Thus, a PEDOT/PSS (hole injection layer) with a thickness of 30 nm is produced.

Next, a toluene solution of a PPV derivative exhibiting yellow light emission (equivalent to 4 g/l) is prepared and applied by spin-coating at 1300 rpm in a nitrogen atmosphere. After that, vacuum baking is carried out at 80° C. for 10 minutes, thus producing a PPV derivative layer (light-emitting layer) with a thickness of 80 nm.

After that, vacuum evaporation of Ca to a thickness of 20 nm and vacuum evaporation of Al to a thickness of 100 nm are carried out, thus forming a cathode.

Further, the present invention can be implemented to use any other compounds to make the emitting layer, for example, using a composite of an organic compound and an inorganic compound as a light-emitting layer in the light-emitting element, and there is no particular limitation placed on the form of a light-emitting element.

What is claimed is:

1. A method for driving a light-emitting device including a light-emitting element, comprising:

writing an analog video signal to each of a plurality of pixels during a writing period;

starting a non-display period after the writing period; and starting a holding period after the non-display period, wherein the light-emitting element in the each of the plurality of pixels is driven at a duty factor of about 36%, in each of k frame periods, wherein the k frame periods exist in one second, and wherein the k is a real number larger than 0.

2. The method according to claim 1, wherein the k frame periods include 60 or more frame periods.

3. A method for driving a light-emitting device including a light-emitting element, comprising:

writing an analog video signal to each of a plurality of pixels during a writing period;

starting a non-display period after the writing period; and starting a holding period after the non-display period, wherein the light-emitting element in the each of the plurality of pixels is driven at a duty factor of about 36%, in each of k frame periods, wherein the writing period, the holding period, and the non-display period are provided in each of the k frame periods, and wherein the k frame periods exist in one second, and wherein the k is a real number larger than 0.

4. The method according to claim 3, wherein the k frame periods include 60 or more frame periods.

5. A method for driving a light-emitting device including a plurality of signal lines and a light-emitting element electrically connected to corresponding one of the plurality of signal lines, comprising:

writing an analog video signal to each of a plurality of pixels during a writing period;

starting a non-display period after the writing period;

starting a holding period after the non-display period, wherein the light-emitting element in the each of the plurality of pixels is driven at a duty factor of about 36%, in each of k frame periods, wherein the writing period, the holding period, and the non-display period are provided in each of the k frame periods, wherein the analog video signal is sequentially inputted to the plurality of signal lines, and wherein the k frame periods exist in one second, and wherein the k is a real number larger than 0.

6. The method according to claim 5, wherein the k frame periods include 60 or more frame periods.

7. The method according to claim 1, wherein the holding period is started simultaneously in all pixels after the non-display period.

8. The method according to claim 3, wherein the holding period is started simultaneously in all pixels after the non-display period.

9. The method according to claim 5, wherein the holding period is started simultaneously in all pixels after the non-display period.

* * * * *